(12) United States Patent
Perrochon et al.

(10) Patent No.: US 7,949,572 B2
(45) Date of Patent: May 24, 2011

(54) DISTRIBUTED ELECTRONIC COMMERCE SYSTEM WITH INDEPENDENT THIRD PARTY VIRTUAL SHOPPING CARTS

(75) Inventors: Louis Vincent Perrochon, Mountain View, CA (US); Arturo E. Crespo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 362 days.

(21) Appl. No.: 11/477,012

(22) Filed: Jun. 27, 2006

(65) Prior Publication Data

US 2007/0299736 A1    Dec. 27, 2007

(51) Int. Cl.
*G06F 17/60* (2006.01)
(52) U.S. Cl. .................... 705/26.41; 705/26.43
(58) Field of Classification Search ............ 705/26, 705/27
See application file for complete search history.

(56) References Cited

U.S. PATENT DOCUMENTS

| | | | |
|---|---|---|---|
| 5,191,410 A | 3/1993 | McCalley et al. | |
| 5,715,314 A | 2/1998 | Payne et al. | |
| 5,802,497 A | 9/1998 | Manasse | |
| 5,999,914 A | 12/1999 | Blinn et al. | |
| 6,029,141 A | 2/2000 | Bezos et al. | |
| 6,029,150 A | 2/2000 | Kravitz | |
| 6,134,307 A | 10/2000 | Brouckman et al. | |
| 6,453,305 B1 | 9/2002 | Glassman et al. | |
| 6,499,052 B1 | 12/2002 | Hoang et al. | |
| 6,523,012 B1 | 2/2003 | Glassman et al. | |
| 6,850,917 B1 | 2/2005 | Horn et al. | |
| 6,876,977 B1 | 4/2005 | Marks | |
| 6,876,983 B1 | 4/2005 | Goddard | |
| 6,925,444 B1 | 8/2005 | McCollom et al. | |
| 6,934,690 B1 * | 8/2005 | Van Horn et al. ............... | 705/26 |
| 6,980,962 B1 * | 12/2005 | Arganbright et al. ........... | 705/26 |
| 7,089,198 B2 | 8/2006 | Freedenberg et al. | |
| 7,197,475 B1 * | 3/2007 | Lorenzen et al. ............... | 705/26 |
| 2001/0007099 A1 | 7/2001 | Rau et al. | |
| 2002/0016766 A1 | 2/2002 | Raja | |
| 2002/0052792 A1 | 5/2002 | Johnson et al. | |

(Continued)

FOREIGN PATENT DOCUMENTS

WO    WO-02/29508 A2    4/2002

(Continued)

OTHER PUBLICATIONS

PCT International Search Report and Written Opinion, PCT/US06/14251, Sep. 10, 2007, 7 pages.

(Continued)

*Primary Examiner* — Adam Levine
(74) *Attorney, Agent, or Firm* — Fenwick & West LLP

(57) ABSTRACT

An electric commerce system includes a broker that enables third parties to create their own independent shopping carts including items from multiple different merchants. An agent creates and stores a shopping cart containing a plurality items from one or more merchants. The customer can view the shopping cart displayed by the agent to determine whether to make a purchase. If the customer indicates a desire to purchase the items in the cart, the customer is transferred to a broker for the checkout and purchase process. The customer can purchase the items in the shopping cart in a single purchase transaction with the broker, rather than having to deal with each of the merchants. The broker interacts with the merchants to complete the purchase transaction by which the customer buys the items in the cart.

36 Claims, 8 Drawing Sheets

U.S. PATENT DOCUMENTS

| | | | |
|---|---|---|---|
| 2002/0069134 A1* | 6/2002 | Solomon | 705/26 |
| 2002/0107772 A1 | 8/2002 | Jain et al. | |
| 2002/0111907 A1 | 8/2002 | Ling | |
| 2002/0120475 A1 | 8/2002 | Morimoto | |
| 2002/0120530 A1 | 8/2002 | Sutton et al. | |
| 2002/0120864 A1 | 8/2002 | Wu et al. | |
| 2002/0128934 A1* | 9/2002 | Shaer | 705/27 |
| 2002/0132662 A1 | 9/2002 | Sharp et al. | |
| 2002/0194087 A1 | 12/2002 | Spiegel et al. | |
| 2003/0033205 A1* | 2/2003 | Nowers et al. | 705/26 |
| 2003/0050855 A1 | 3/2003 | Jaffe et al. | |
| 2003/0065577 A1 | 4/2003 | Haynes et al. | |
| 2003/0093320 A1 | 5/2003 | Sullivan | |
| 2003/0200156 A1 | 10/2003 | Roseman et al. | |
| 2004/0002906 A1 | 1/2004 | Von Drehnen et al. | |
| 2004/0030619 A1 | 2/2004 | Stokes et al. | |
| 2004/0034597 A1 | 2/2004 | Durand | |
| 2004/0073498 A1 | 4/2004 | Breen et al. | |
| 2004/0117261 A1 | 6/2004 | Walker et al. | |
| 2004/0254844 A1 | 12/2004 | Torres | |
| 2005/0027617 A1 | 2/2005 | Zucker et al. | |
| 2005/0033694 A1 | 2/2005 | Perrin | |
| 2005/0108104 A1 | 5/2005 | Woo | |
| 2005/0114228 A1 | 5/2005 | Wadhwani | |
| 2005/0204041 A1 | 9/2005 | Blinn et al. | |
| 2005/0228750 A1 | 10/2005 | Olliphant et al. | |
| 2005/0256806 A1 | 11/2005 | Tien et al. | |
| 2006/0097044 A1 | 5/2006 | Boyd et al. | |
| 2006/0122895 A1 | 6/2006 | Abraham et al. | |
| 2006/0248011 A1 | 11/2006 | Hecht-Nielsen et al. | |
| 2007/0043636 A1 | 2/2007 | Foster | |
| 2008/0120129 A1 | 5/2008 | Seubert et al. | |

FOREIGN PATENT DOCUMENTS

| | | | |
|---|---|---|---|
| WO | WO0229508 A2 * | 4/2002 | |

OTHER PUBLICATIONS

PCT International Search Report and Written Opinion, PCT/US07/72269, Aug. 14, 2008, 12 Pages.

"Shopping Cart at PoshTots," PoshTots LLC, 2001-2006, [online] [Retrieved on Apr. 6, 2006] Retrieved from the Internet<URL:http://www.poshtots.com/shopcart/shopcart.asp>.

"Touratech-USA.comand CycoActive.com shared Shopping Cart," Touratech USA, [online] [Retrieved on Apr. 6, 2006] Retrieved from the Internet<URL:http://www.touratech-usa.com/shop/shoppingcart.lasso?-session=touratech:B0DFDE2CCF5A86CA5B1487...>.

Waiter.com—Share your order information, Waiter.com, Inc., 1995-2006, [online] [Retrieved on Mar. 10, 2006] Retrieved on the Internet<URL:http://www.waiter.com/wwwsys/shareinfo.html>.

Amazon.com—Enhancing Your Shopping Experience, Listmania® Lists, [online] [Retrieved on Mar. 24, 2006] Retrieved on the Internet<URL:http://www.amazon.com/exec/obidos/tg/browse/-/14279651/sr%3D53/104-4789231-0552724.

Bezard, Gwenn, "Online Micro-Payments: Has the Time Come?", banktech.com, [online] [Retrieved on Jan. 26, 2005] Retrieved from the Internet<U RL:htto://www.banktech.com/utils/DrintableArticle.ihtml?doc id=17700519>.

BitPass, Press Release (2003) "BitPass Announces General Availability of Micropayment System," [online] [Retrieved on Jan. 26, 2005] Retrieved from the Internet<URL:https://www.bitpass.com/learn/releases/releases2003.html>.

Geer, David, "E-Micropayments Sweat the Small Stuff," *IEEE Computer*, vol. 37, No. 8, Aug. 2004, pp. 19-22.

Rivest, R.L. et al., "PayWord and MicroMint: Two Simple Micropayment Schemes," MIT Laboratory for Computer Science, Cambridge, Mass and Weizmann Institute of Science, Applied Mathematics Department, Rehovot, Israel, May 7, 1996, pp. 1-18.

Sung-Ming Yen and Pao-Yu Ku, "Improved Micro-payment System, Technical Report TR-98-2," TamKang University, Department of Electrical Engineering, Laboratory of Cryptography and Information Security, Taiwan, Apr. 27, 1998, pp. 1-12.

PCT International Search Report and Written Opinion, PCT/US05/30729, Apr. 9, 2007, 8 Pages.

"Happy Birthday Yahoo! Canada Shopping", Canada NewsWire. Ottawa: Nov. 26, 2001, p. 1, [online] [retrieved on Jul. 8, 2009] Retrieved from the internet <URL:http://proquest.umi.com/pqdweb?did=91659103&sid=5&Fmt=3&c1 ientId=19649&RQT=309&VName=PQD>.

"Statement in Accordance with the Notice From the European Patent Office Dated Oct. 1, 2007 Concerning Business Methods," Journal of The European Patent Office, Nov. 1, 2007, p. 592-593.

Supplementary European Search Report, European Patent Application No. EP 06750318, Jun. 23, 2010, 6 Pages.

First Office Action for Chinese Patent Application No. 200680020308.6, Apr. 8, 2010, 8 pages.

Second Office Action for Chinese Patent Application No. 200680020308.6, Dec. 27, 2010, 9 pages.

* cited by examiner

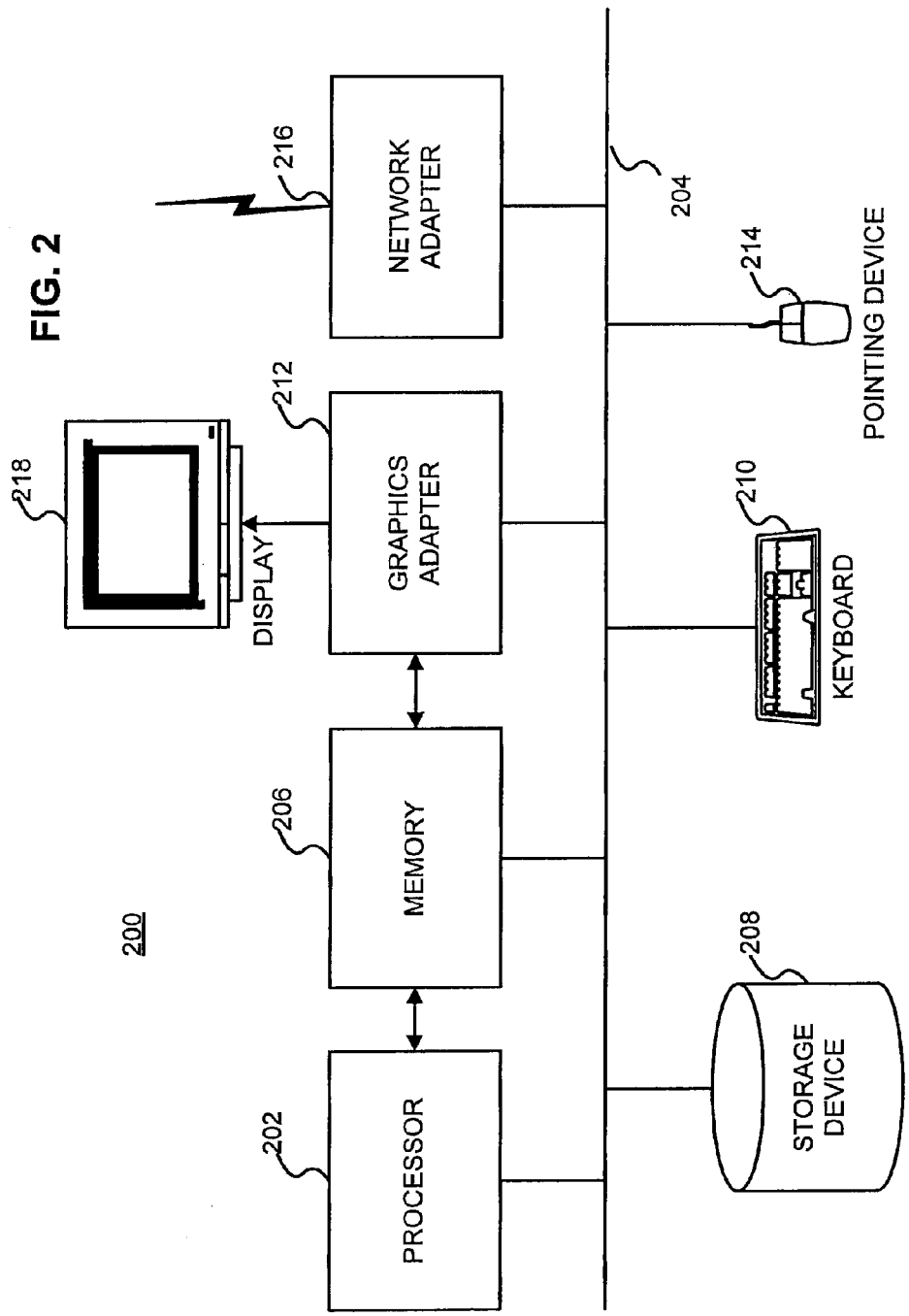

DISTRIBUTED ELECTRONIC COMMERCE SYSTEM WITH INDEPENDENT THIRD PARTY VIRTUAL SHOPPING CARTS

CROSS-REFERENCE TO RELATED APPLICATIONS

This application is related to U.S. patent application Ser. No. 11/112,176, filed Apr. 22, 2005, entitled "Distributed Electronic Commerce System With Centralized Point Of Purchase," to U.S. patent application Ser. No. 11/299,168, filed on Dec. 29, 2005, entitled "Distributed Electronic Commerce System with Centralized Virtual Shopping Carts," to U.S. patent application Ser. No. 11/426,833, filed Jun. 27, 2006, entitled "Electronic Commerce System Utilizing Custom Merchant Calculations," and to U.S. patent application Ser. No. 11/426,838, filed Jun. 27, 2006, entitled "Determining Taxes in an Electronic Commerce System," each of which is hereby incorporated by reference herein in its entirety, including any appendices or attachments thereof, for all purposes.

BACKGROUND

This invention pertains in general to electronic commerce and in particular to a system for centralizing shopping from multiple Internet-based merchants.

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text and/or music and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing a credit card number or shipping address, to the merchants. In addition, where a customer is interested in numerous related items from numerous different merchants, it can be cumbersome to collect all of these items from these merchants and purchase them one by one. As a result, there is a need in the art for an electronic commerce system that allows customers to independently create a collection of items from multiple merchants that can be purchased in a single transaction and in a manner that alleviates customer concerns regarding making purchases from smaller or lesser known merchants.

SUMMARY

The above need is met by an electronic commerce system that, in one embodiment, includes a shopping cart management module for receiving information regarding a virtual shopping cart created and stored by an agent responsive to a customer indicating a desire to purchase items contained within the virtual shopping cart. In some embodiments, the shopping cart is adapted to hold items offered by different online merchants. In some embodiments, the system further includes a transaction module for enabling the customer to purchase the items within the shopping cart.

Another embodiment includes a method of conducting electronic commerce where pledges are received from a plurality of customers to pay a portion of the total price of an item contained within a virtual shopping cart. The method further includes charging each of the customers the portion indicated by that customer in response to a positive determination. In addition, the method includes enabling the plurality of customers to purchase the item.

BRIEF DESCRIPTION OF THE DRAWINGS

FIG. 2 is a high-level block diagram illustrating a functional view of a typical computer system for use as one of the entities illustrated in the environment of FIG. 1 according to one embodiment.

DETAILED DESCRIPTION

A. Overview

Figure 1:
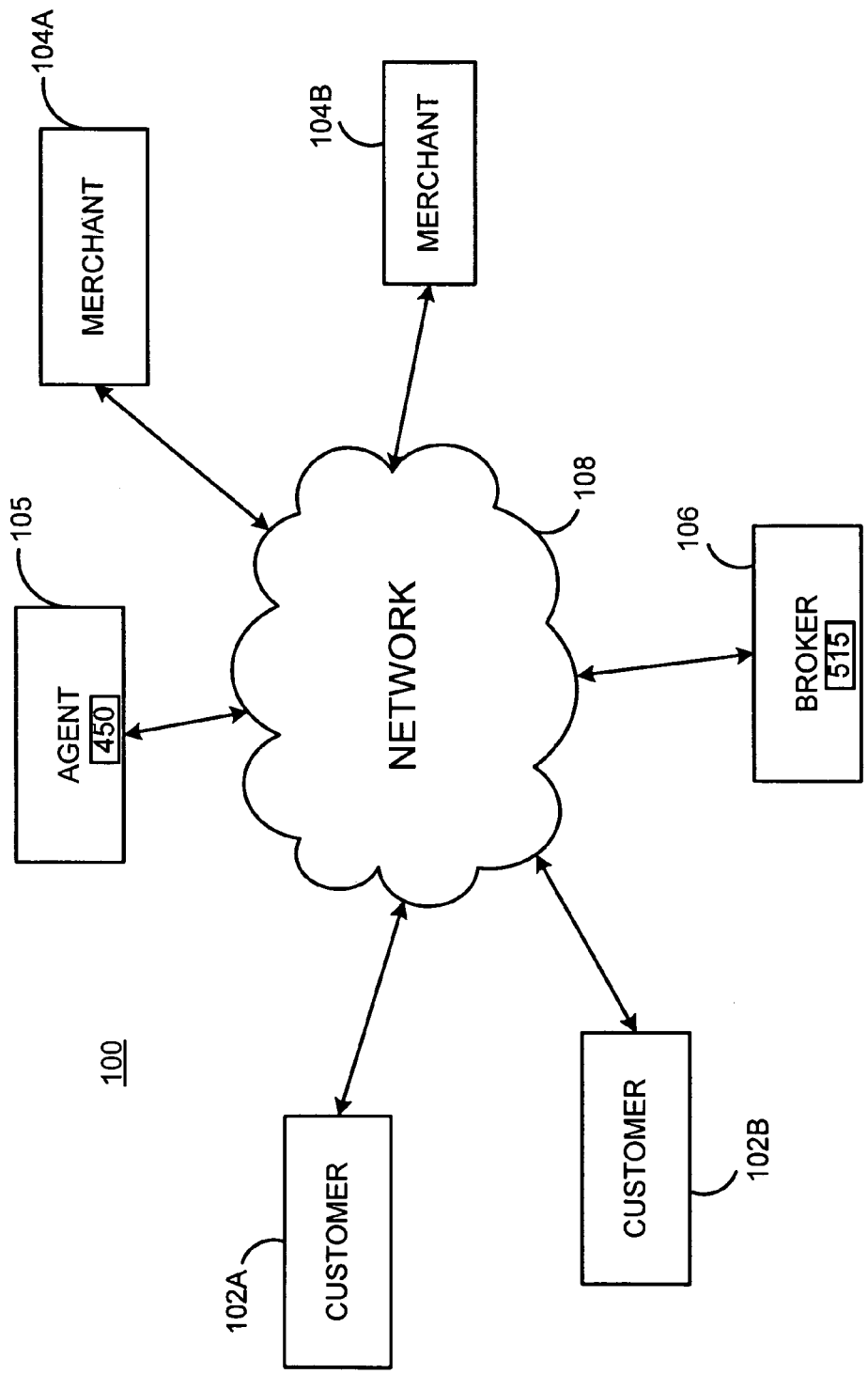
FIG. 1 is a high-level block diagram of a computing environment according to one embodiment.

FIG. 1 is a high-level block diagram of a computing environment 100 according to one embodiment of the present invention. FIG. 1 illustrates two customers 102A and 102B, two merchants 104A and 104B, an agent 105, and a broker 106 connected by a network 108. FIG. 1 and the other figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A" and/or "104B" in the figures).

The customer 102 in this embodiment represents an entity that obtains items via the network 108 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "purchase" (e.g., transactions in which no money is exchanged). End-users acting as customers 102 can include end-users purchasing items for their own use or as gifts, and/or end-users purchasing items for the use of a company or other enterprise with which the end-users are associated, or for other purposes.

In one embodiment, the customer 102 includes a computer system utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the customer 102 includes a network-capable device other than a computer system, such as a personal digital assistant (PDA), a cellular telephone, a pager, a smartphone, a television "set-top box" etc. For example, the customer 102 can be a cell phone communicating via short message service (SMS) or another mechanism. Although FIG. 1 illustrates two customers 102, embodiments of the present invention can have thousands or millions of customers participating in the electronic commerce system described herein. Only two customers 102 are illustrated in order to simplify and clarify the present description.

Similarly, the merchant 104 represents an entity that sells items on the network 108 or makes items available through other types of transactions. The merchant 104 offering the item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale."

In one embodiment, the merchant 104 includes a computer system acting as a web server that is utilized to offer the items to potential customers 102. In other embodiments, the merchant 104 includes a cellular phone or similar device (e.g., that communicates via SMS). The merchant 104 is said to be "online," meaning that the merchant 104 provides a presence on the network 108 (e.g., the Internet, a cellular network, or other type of network). The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc. In some embodiments, the merchant 104 includes a network-capable device other than a computer system (as described above with regard to the customer 102, such as a personal digital assistant (PDA), a cellular telephone, a pager, a smartphone, a television "set-top box" etc. Although FIG. 1 illustrates only two merchants 104, embodiments of the present invention can have many merchants participating in the electronic commerce system. The two merchants 104 are illustrated in order to simplify and clarify the present description.

The agent 105 represents an entity that allows customers 102 to shop using a "shopping cart" metaphor. In some embodiments, the agent 105 creates and displays on a website or otherwise makes available a virtual shopping cart including items that can be purchased (e.g. via SMS, etc.). Depending upon the embodiment, a single shopping cart can store items being sold by one merchant 104 or by multiple merchants 104 that were collected into a single shopping cart (and/or multiple shopping carts) created by the agent 105. The shopping cart can store items from the same merchant or from different online merchants. Different online merchants include merchants that generally operate separately (e.g., WALMART™ and MACYS™). Subsidiaries or partners of merchants, and also merchants that sell products through the same mechanism can further be different online merchants. For example, TOYS "R" US™ and TARGET™ might both sell products through AMAZON.COM™, but they still represent different online merchants. A customer 102 who desires to purchase one or more items that are present in a virtual shopping cart created and stored by the agent can indicate that he or she would like to purchase those items. For example, the customer 102 might indicate a desire to purchase by selecting a button (e.g., a "buy" button, a "purchase" button, a "checkout" button, and so forth) associated with the shopping cart, by clicking on a shopping cart icon, or otherwise indicating that he/she wishes to purchase the items in the shopping cart. The customer 102 can then be transferred over to the broker 106 (described below) for checkout and purchase of the items. Thus, by acting as an agent 105, a third party can independently create his/her own shopping cart containing any items the third party chooses, manage the cart, share the cart with other users, etc. In some embodiments, the agent 105 includes a network-capable device other than a computer system (as described above with regard to the customer 102, such as a personal digital assistant (PDA), a cellular telephone, a pager, a smartphone, a television "set-top box" etc. Although FIG. 1 illustrates only one agent 105, embodiments of the present invention can have many agents participating in the electronic commerce system.

The broker 106 represents an entity that serves as an intermediary for the transaction between the customer 102, the agent 105, and the merchant(s) 104. In one embodiment, the broker 106 operates a system that functions as a centralized place at which a customer 102 can be directed for a checkout process for items stored in the shopping cart that the customer 102 wishes to purchase. For example, once the customer 102 has indicated a desire to purchase items in a shopping cart stored by the agent 105, the customer 102 can be redirected from the agent's website to the broker's website. The broker 106 interacts with the customer 102 and allows the customer to purchase the items in the shopping cart. The broker 106 further interacts with the one or more merchants 104 selling the various items in the cart to manage the transaction. Thus, the customer 102 can patronize multiple merchants 104, but use a single shopping cart containing all of the items of interest. In addition, the customer 102 only needs to provide payment information to the broker 106, since the broker 106 manages the checkout and payment process. Although FIG. 1 illustrates only a single broker 106, embodiments of the present invention can have multiple brokers participating in the electronic commerce system.

In one embodiment, the broker 106 is within a different "domain" than the customer 102 and/or merchant 104 and/or agent 105. As used here, the term "domain" generally refers to a sphere of influence. A broker 106 and merchant 104, for example, are in different domains when they are independent of each other and lack a shared point of control. There is not necessarily a relationship between the domain in which a broker 106 and/or merchant 104 or agent 105 reside and the domain names utilized by those entities on the network 108, although the use of different domain names may constitute evidence that the broker 106 and merchant 104 or agent 105 are independent and thus are in different domains. In some embodiments, the broker 106 is within the same domain as some customers 102 and/or merchants 104 and/or agents 105, and in a different domain than other customers and/or merchants and/or agents.

FIG. 1 illustrates a shopping cart module 450 within the agent 105. The module 450 can create a cart and store items in the cart that are available from one or more merchants 104. When this description refers to "storing an item in a cart," it should be understood that a virtual representation of the item is actually stored, and not the item itself. In some embodiments, the agent encodes a representation of the shopping cart in XML, and the agent 105 can provide the cart to the broker 106 when the customer 102 is ready for checkout. In some embodiments, the virtual representation includes information describing the items in the cart. The information can include, for example, the merchant's unique identifier for the item, the item's price, the type of the item, and so forth. Depending upon the embodiment, a shopping cart can store all or a subset of this item information.

In some embodiments, the agent 106 browses websites managed by one or more merchants 104 and selects items to be added to the cart. In other embodiments, the agent creates a cart (e.g., using a text editor) by referring to a document or specification that includes instructions regarding how to create a shopping cart. For example, the document with instructions might be published by the broker 106, and the agent 105 can review the document and use the information to create a cart. The agent can use an identifier to reference the items offered by the merchants that are listed in the cart. For example, the agent 105 can have the cart refer to the merchant's stock keeping unit (SKU), a universal product code (UPC), a universal archival network code (EAN), an international standard book numbering code (ISBN), the cart could include a link to the merchant's web page for the item, or some other mechanism can be used that allows the broker 106 to be able the find the merchant/item.

As one example of a shopping cart, an agent 105 can create a cart containing items for a specific purpose, such as a shopping cart containing wedding registry gifts, ingredients for a recipe and/or other groceries, music to download, cosmetics and/or clothes worn by a model or celebrity, items for a Halloween costume, parts for a children's puppet theater and puppets, items for usage in arranging a child's party with a particular theme (e.g., a princess party), etc. Thus, the agent 105 might display on a website a description of a recipe and might also provide a shopping cart containing all of the ingredients for the recipe, even when the ingredients are from different merchants in different domains. In another example, the agent 105 might describe a Halloween costume and provide a shopping cart that includes all of the items for the costume, regardless of whether the items are from one or multiple merchants 104.

In one embodiment, the shopping cart module 450 provides the agent 105 with an interface through which the agent 105 can perform manipulations such as creating, modifying, and deleting shopping carts and/or the items stored in the carts. Likewise, the agent 105 can use the interface to perform manipulations including duplicating shopping carts (and the items within them) and moving items among the shopping carts. The interface also allows the agent 105 to associate names, comments, graphics, and other descriptive content with the shopping carts.

In some embodiments, the customer 102 can also use the interface to adjust the contents of the agent's 105 shopping cart (e.g., modifying, adding, deleting, moving items among different carts, duplicating carts, etc.). For example, an agent 105 can create a shopping cart for storing the supplies to be ordered by a customer 102 wishing to throw a birthday party for his/her child with a princess theme. If the customer 102 identifies other items that should be purchased to throw such a party, the customer 102 can add these items before making the shopping cart order.

In one embodiment, the interface provided by the shopping cart module 450 allows a customer 102 to perform comparisons of items within one or more of the shopping carts. For example, the shopping cart module 450 can provide a table that lists features of the various items as specified by the item information received from the merchants 104 offering the items. The customer 102 can thus use the shopping cart module 450 to compare items from different merchants prior to purchase.

In some embodiments, the shopping cart module 450 interface allows an agent 105 to make the cart available for viewing by various customers 102. In one embodiment, the agent 105 (or the customers 102) can make the cart available to other people on the network 108 by (e.g., by displaying it on a website, publishing a link to the cart on a different web page, such as a blog, sending an email or an instant message containing the link to other people, make the cart available via a chat room, etc.). The other people (e.g., potential customers 102) can access the shopping cart on the website or by using the link or other identifying information to find the location at which the shopping cart can be viewed. As used herein, a "link" is any identifier or information that uniquely identifies the shopping cart (e.g., unique ID number, a URL that encodes the cart's identifier, another value, and so forth).

In some embodiments, the agent 105 can create one or more shopping carts on the request of a customer 102 or of multiple customers 102. For example, the agent 105 can create multiple shopping carts, with each cart containing one or more items that a customer 102 may wish to receive as gifts. Then, the customer 102 can invite other people to purchase the items in one or more of the carts displayed on the agent's website. This technique allows the customer to create a gift list from multiple merchants and present the gifts at a single location, and is useful for wedding registries, baby showers, and the like. Again, the checkout and payment process occurs via the broker 106. Upon indication of a desire to purchase items in a shopping cart (e.g., by clicking a "buy" button, etc.), the purchaser is transferred to the broker 106 to complete the transaction.

In some embodiments, the customer 102 acts as an agent 105 and creates his or her own shopping cart on a website and then purchases the items in the cart through a purchase transaction with the broker 106. The customer 102 can then continue to act as an agent 105 and make the shopping cart of items available for purchase by other customers 102 in the same manner the agent 105 would.

FIG. 1 illustrates a shopping cart management module 515 within the broker 106. As explained above, the customer 102 can select a pre-arranged virtual shopping cart created by an agent 105 that contains items from one or more merchants, and upon selection, the customer 102 is redirected to the broker 106 for the checkout and payment process. This shopping cart management module 515 can thus receive information regarding the shopping cart selected. For example, in some embodiments, the shopping cart management module 515 receives from the agent 105 one or more virtual shopping carts for the customers 102 (e.g., the representation of the cart encoded in XML by the agent 105). The module 515 can receive a single shopping cart for each customer 102 or multiple carts. In some embodiments, the information that the module 515 receives includes descriptions of items included in the cart, such as information about which merchants are selling the items, links to the merchants' websites, the types of items, the prices of the items, and so forth. In some embodiments, the module 515 also receives one or more merchant identifiers for the items (e.g., a merchant's SKU, a UPC, an EAN, an ISBN, a URL that encodes the cart's identifier, and so forth). In some embodiments, instead of receiving the shopping cart itself, the broker 106 receives a link or other identifier pointing to the cart on the agent's website.

In some embodiments, each shopping cart received by the shopping cart management module 515 is associated with a unique identifier that allows the broker 106 to keep track of what shopping carts are received and which customer 102 is associated with that cart. In some embodiments, the broker 106 receives the shopping cart information described above directly from the agent 105. The agent 105 can send this information (e.g., description of the shopping cart and items within the cart, identifiers, etc.) to the broker 106 once the customer indicates that he/she is ready to purchase the items in the shopping cart. In other embodiments, the agent 105 sends this information to the broker 106 upon the broker's 106 request for such information, while the broker 106 is managing the transaction with the customer 102. In still other embodiments, the broker 106 can obtain information regarding the shopping cart items from the merchant(s) 104.

In some embodiments, the shopping cart management module 515 deletes information regarding shopping carts that have been received by the broker 106, but for which checkout/payment is not completed and which carts have not been accessed within a certain time period (e.g., 90 days). A particular time interval can be set, at the end of which the broker 106 will delete the information regarding the abandoned cart.

The network 108 represents the communication pathways between the customers 102, merchants 104, agent 105, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as Ethernet, 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above. The network 108 is not limited to the Internet, but can include other types of networks, such as a cellular network (e.g., data can be sent via SMS, etc.).

II. SYSTEM ARCHITECTURE

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104, the agent 105 and broker 106. Thus, the customer computer system can be a standard personal computer system. The merchant 104, agent 105, and broker 106 computer systems, in contrast, may comprise more powerful computers and/or multiple computers working together to provide the functionality described herein.

Figure 3:
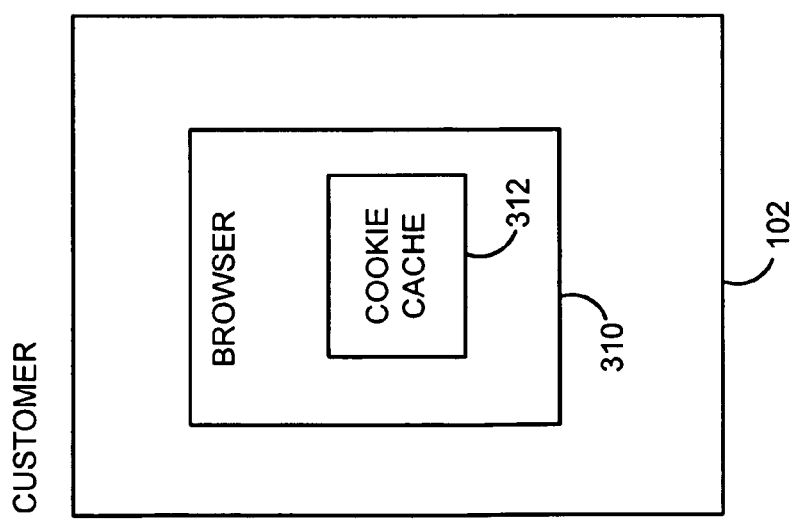
FIG. 3 is a high-level block diagram illustrating modules within a customer according to one embodiment.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner (the same is true of FIGS. 4a, 4b, and 5).

As shown in FIG. 3, the customer 102 includes a browser module 310 that allows the customer to view web pages provided by the merchant 104, broker 106, agent 105, and/or other entities on the network 108. In one embodiment, the browser module 310 is a conventional web browser, such as MICROSOFT INTERNET EXPLORER or MOZILLA FIREFOX. In one embodiment, the browser module 310 maintains a cookie cache 312 that stores cookies associated with web sites on the network 108. The agent 105 and/or broker 106 can communicate with the browser module 310 and instruct it to create a cookie in the cookie cache 312 holding certain information. The browser module 310 provides the cookie to the agent 105 and/or broker 106 when the browser connects to the site that created that cookie or another site with authorization to access the cookie.

Figure 4A:
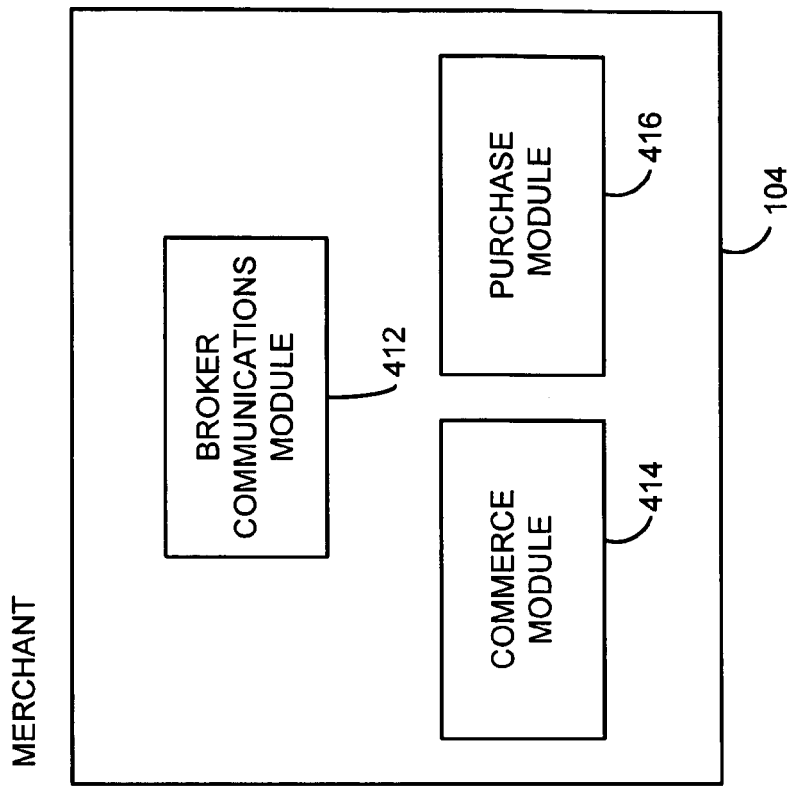
FIG. 4a is a high-level block diagram illustrating modules within a merchant according to one embodiment.

FIG. 4a is a high-level block diagram illustrating modules within a merchant 104 according to one embodiment. In one embodiment, a broker communications module 412 communicates with the broker 106 via the network 108. In one embodiment, merchant-broker communications are conducted using the web services description language (WSDL). In one embodiment, the broker communications module 412 uses WSDL to describe the services it provides and ascertain the services provided by the broker 106. The broker communications module 412 uses XML-based remote procedure calls (RPCs) to provide information to the broker 106 and receive information in return. In other embodiments, the broker communications module 412 communicates with the broker 106 using other techniques and/or protocols, such as via XML-encoded messages, HTML web pages intended for review by human users, proprietary communications protocols, etc.

A commerce module 414 allows the merchant 104 to engage in electronic commerce transactions. In general, the commerce module 414 allows the merchant 104 to create and manage a catalog of items available for sale. In some embodiments, the agent 105 can browse the catalog to find items that the agent 105 desires to include in a virtual shopping cart that the agent 105 is creating. For example, if the agent 105 is creating a website describing the items needed to create a child's party with a princess theme, the agent 105 might search for merchants 104 selling items associated with princess-themed child's parties. The agent 105 can review the websites of merchants 104 that are identified as potential sellers of princess party items, and the agent 105 can select items of interest to be included in a shopping cart that the agent 105 will display on his/her website. The agent 105 can thus encode a representation of a cart (e.g., in XML) describing items of interest available from the merchant 104. The agent 105 can obtain from the merchant's website descriptions or other information regarding items the agent 105 desires to place in a shopping cart (and can include this information in the representation encoded).

A purchase module 416 can interface with the broker to electronically accept customer and/or payment information from the broker 106. For example, a customer 102 can provide payment information to the broker 106 and instruct the broker 106 to purchase an item from the merchant 104. The broker 106 supplies the payment information to the merchant's purchase module 416 and interacts with the purchase module 416 to effect the purchase on behalf of the customer 102.

Figure 4B:
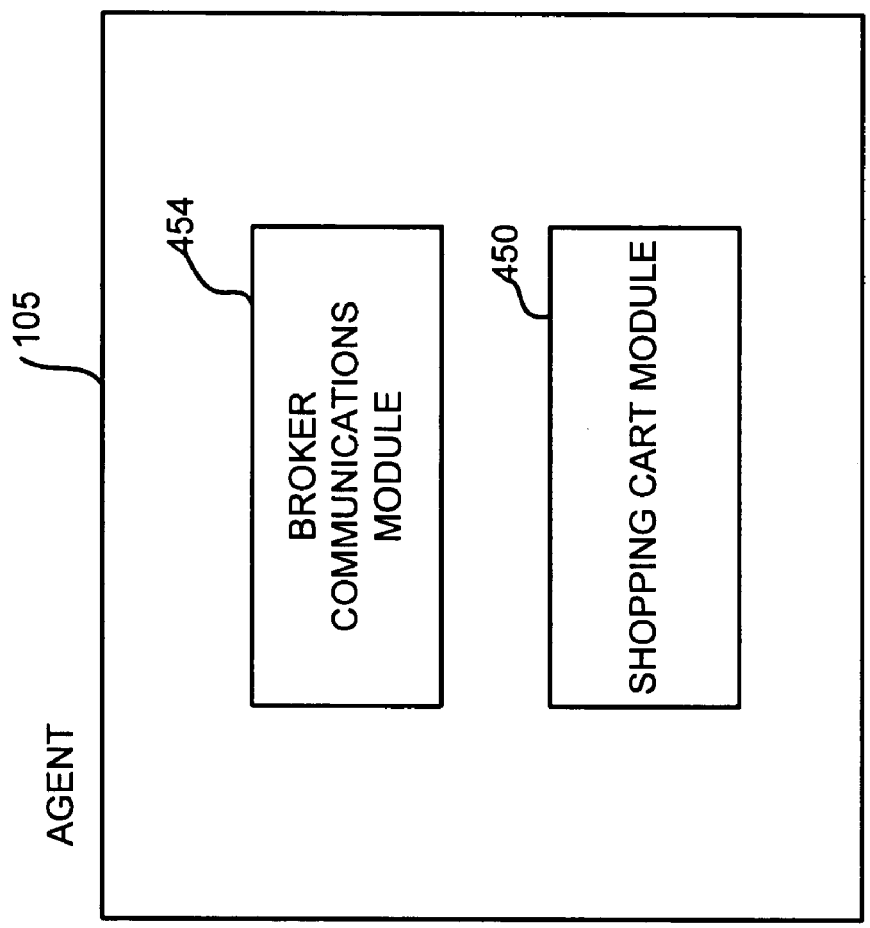
FIG. 4b is a high-level block diagram illustrating modules within an agent according to one embodiment.

FIG. 4b is a high-level block diagram illustrating modules within the agent 105 according to one embodiment. As described above, the shopping cart module 450 creates the virtual shopping cart (e.g., created by listing items selected by the agent 106 from the merchants' websites, or created by the agent using a shopping cart specification instructing how to create the cart via a text editor, or created via another mechanism).

In some embodiments, a broker communications module 454 communicates with the broker 106 via the network 108. The agent-broker communications can be conducted in the same manner as described above regarding the merchant-broker communications. The broker communications module 456 can use XML-based messages or other techniques and/or protocols (e.g., HTML web pages, proprietary communications protocols, etc.) to provide information to the broker 106 and receive information in return. For example, the agent 105 can send the shopping cart selected by a customer 102 for purchase to the broker 106 via the broker communications module 454.

Figure 5:
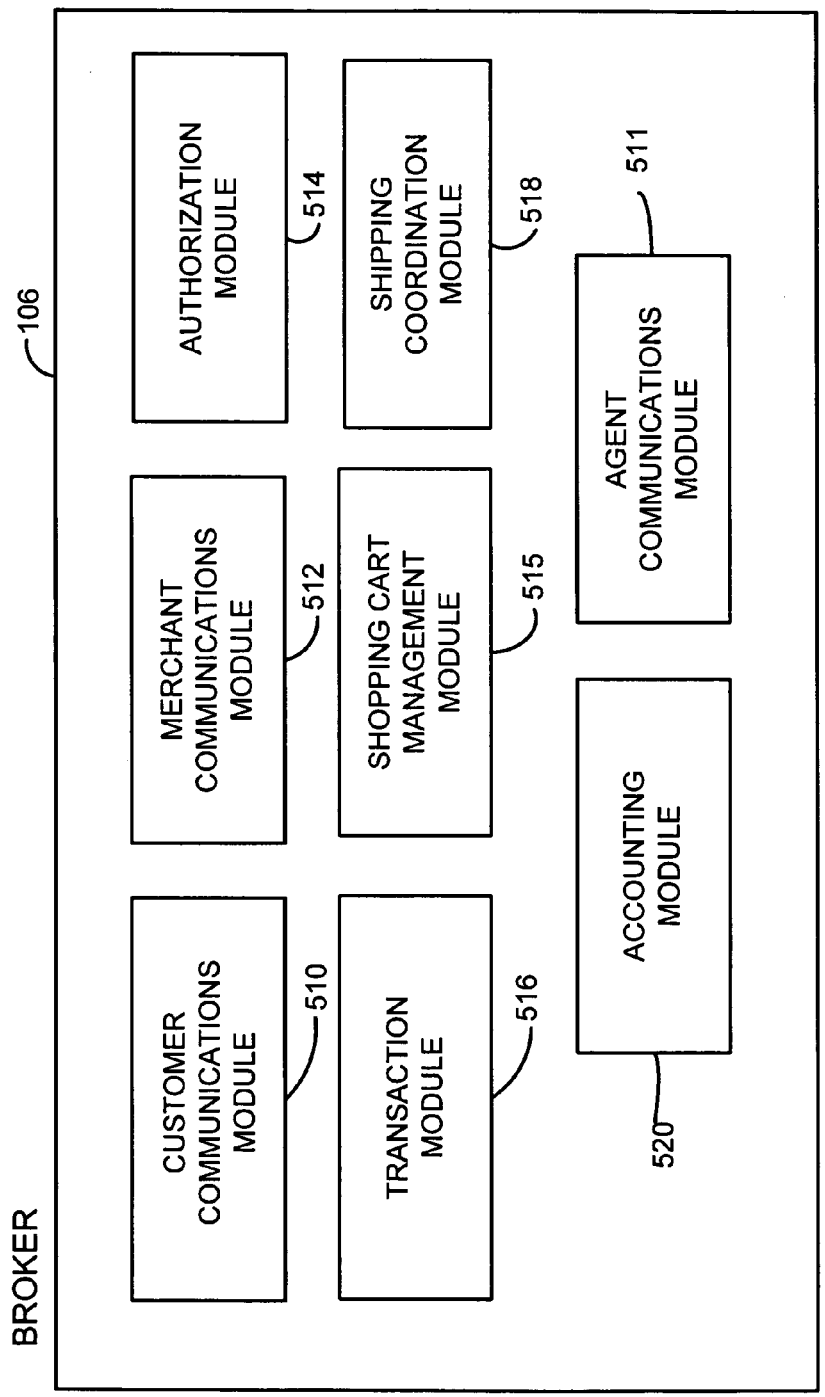
FIG. 5 is a high-level block diagram illustrating modules within the broker according to one embodiment.

FIG. 5 is a high-level block diagram illustrating modules within the broker 106 according to one embodiment. The broker 106 includes a customer communications module 510, an agent communications module 511, and a merchant communications module 512 for respectively communicating with the customer 102, the agent 105, and the merchant 104. The customer communications module 510 allows the broker 106 to communicate with the customer 102, receive payment information, shipping preferences, and other preferences or information that the customer 102 may need to provide during checkout. The module 510 communicates with the customer 102 via the network 108. In one embodiment, the module 510 includes a web server that provides web pages to the customer 102 and receives end-user input sent over the network 108 by the customer's browser module 310. The customer communications module 510 thus allows a customer to navigate the broker's web site. The agent communications module 511 allows the communications between the agent 105 and the broker 106, whereby the broker 106 can receive a shopping cart from the agent 105 when the customer 102 has indicated a desire to purchase the cart and has been redirected to the broker 106 for checkout. The broker-agent communications can occur in a manner similar to the broker-merchant communications described above regarding FIG. 4a. The merchant communications module 512 allows the broker 106 to communicate with the merchant 104 regarding purchase of the items in the cart, shipping options available, updating of price information, and so forth. The broker-merchant communications can occur as described above regarding FIG. 4a.

An authorization module 514 can authenticate and authorize parties with whom the broker 106 interacts in a transaction. In some embodiments, the module 514 authenticates and authorizes customers 102 seeking to use the broker 106 for purchases. In one embodiment, the authorization module 514 maintains an ID, password, and/or other information for each customer 102. The customer 102 supplies the correct information in order to identify and authenticate itself. In general, when a customer 102 interacts with the broker 106 to make a purchase, the customer's relationship with the broker fits into one of three categories: new customer, existing customer that has not been active recently, or existing active customer. In one embodiment, the authorization module 514 determines the category of the customer 102 and responds accordingly.

If the customer 102 is new, an embodiment of the authorization module 514 presents the customer with one or more web pages that allow the customer to create an account and select an ID, password and/or other identifying information. In one embodiment, the customer 102 also supplies payment information specifying a charge account and/or creating a stored value. The payment information can include, for example, a credit card number or a gift certificate identifier. The customer can also supply information including mailing/shipping addresses and settings for miscellaneous preferences.

If the customer 102 already has an account but has not been active recently (e.g., within the previous 10 minutes), in one embodiment the authorization module 514 provides the customer with the standard login prompt and thereby allows the customer to log into the broker 106. If the customer 102 has been active recently, one embodiment of the authorization module 514 allows the customer to directly access the broker 106 without additional authentication procedures. After each successful login, one embodiment of the authorization module 514 places a cookie in the customer's browser module 310 that identifies the customer and indicates the time of the customer's last login. In another embodiment, the cookie identifies the expiration date/time after which the customer's activity is no longer considered "recent." The cookie thus allows the authorization module 514 to determine the customer's status with respect to the broker 106 and respond appropriately.

In one embodiment, the authorization module 514 allows a customer to conduct limited interactions with the broker 106 without establishing an account or providing identifying and/ or authenticating information. For example, in one embodiment the agent 105 and/or merchant 104 provides the customer's web browser 310 with a cookie that identifies a shopping cart storing items selected by the customer 102 from the agent 105. When the customer 102 interacts with the broker 106, the customer's browser 310 provides the cookie to the broker 106, and the authorization module 514 allows the customer to perform limited actions even though the customer has not been identified and/or authenticated.

In some embodiments, the authorization module 514 authorizes the merchant 104 and/or the agent 105 in a manner similar to the authentication of the customer 102. In some embodiments, the merchant 104 and/or agent 105 must supply a password or some other identifying information to the broker 106 to be authenticated before conducting a transaction with or otherwise interacting with the broker 106. For example, the agent 105 might be interested in interacting with the broker 106 where the agent 105 receives a percentage of the transaction from the broker (e.g., to review the commissions made). The agent 105 might be required to enter a password or other information to access the commission data. As another example, the agent 105 might include a digital certificate (e.g., used when submitting cart, etc.) or a digitally signed message that the broker 106 can use to authenticate the agent 105.

The shopping cart management module 515 is described above. A transaction module 516 allows a customer 102 to purchase the items in a shopping cart created by the agent 105 and selected by the customer 102. In one embodiment, the transaction module 516 allows the customer to specify the methods of payment and shipping, along with any other details that are necessary and/or desired for the transaction. The transaction module 516 uses the shipping address specified by the customer 102 and the shipping rules received from the merchant 104 to calculate the rates for the shipping options. Similarly, the transaction module 516 uses the shipping address and taxation rules from the merchant 104 to calculate any taxes on the purchase. Some examples of how to compute shipping, taxes, and other costs in an electronic commerce system are described in U.S. patent application Ser. No. 11/426,833, filed Jun. 27, 2006, entitled "Electronic Commerce System Utilizing Custom Merchant Calculations," and in U.S. patent application Ser. No. 11/426,838, filed Jun. 27, 2006, entitled "Determining Taxes in an Electronic Commerce System," both of which are hereby incorporated by reference herein in their entireties for all purposes.

The transaction module 516 determines the total cost of the purchase, determines what to charge the customer 102, and can provide the customer with a receipt. Therefore, the transaction module 516 allows the customer to purchase multiple items from multiple different merchants without needing to provide each merchant 104 with payment and/or shipping information. In one embodiment, the transaction module 516 stores payment and/or shipping information for a customer 102 so that it does not need to be provided each time the customer makes a purchase. By relying on this stored information, a customer 102 can purchase the items from multiple merchants 104 that are contained in a cart in a single transaction. The customer 102 does not have to directly deal with each merchant 104 through multiple separate transactions. Alternatively, the customer 102 can designate and purchase only selected items in the cart in the transaction.

In some embodiments, the transaction module 516 dynamically updates prices of items in the shopping cart. In these embodiments, the customer 102 might be notified in advance that the prices of items may change. For example, the prices may have increased or decreased since the items were initially placed in the shopping cart by the agent 105. In some embodiments, the agent 105 regularly updates the prices. However, in other embodiments, the broker 106 determines the prices at the time of checkout. The broker 106 can contact each of the merchants to determine the current price of the items. If the prices have increased or decreased, the broker 106 can adjust the total price for the shopping cart. In some embodiments, the broker 106 also displays to the customer 102 the shopping cart with the updated prices and obtains approval from the customer 102 to continue with the transaction. If an item in the cart is no longer available, the broker 106 can notify the customer 102 and either get approval for the revised cart (minus that item) or allow the customer 102 to find an alternative item (or the broker 106 can present to the customer 102 alternatives available from different merchants 104). In some embodiments, the shopping cart expires after a certain time period (e.g., 30 days, 60 days, 90 days, etc.) to minimize the chances that prices have been changed before the purchase is made.

In some embodiments, the customer 102 is not provided prices for the items in the cart initially, but is notified that the items in the cart are priced at checkout. At checkout, the broker 106 can determine the prices by reviewing the items at the merchant's websites or by contacting the merchants. The broker 106 can present the shopping cart including the newly determined prices to the customer 102. The customer 102 can then approve or not the total price determined by the broker 106 on checkout.

In other embodiments, the prices of items in the cart are static and are not revised by the broker 106. In these embodiments, the merchants 104 may have agreed in advance to the quoted price and agreed to honor that price even if the price later changed. In some embodiments, the broker 106 presents the static price to the merchant 104 and the merchant 104 has the opportunity to refuse to the sell the item for that price if the merchant's listed price for the item has since increased. Thus, the customer 102 can purchase the cart without that item, can search for the item from a different merchant 104, can agree to pay a higher price offered by the merchant 104, etc. In some embodiments, the broker 106 can negotiate with the merchant 104 (or allow the customer 102 to negotiate) for a price between what the merchant 104 is now requesting and what the customer 102 was initially quoted.

A shipping coordination module 518 interacts with the merchant 104 to inform the merchant 104 of the purchase and coordinate shipping of the purchased items to the customer 102. In one embodiment, the shipping coordination module 518 provides the customer-indicated shipping address and shipping options to the merchant 104. In another embodiment, the shipping coordination module 518 instructs the merchant to ship the items to a placeholder or third-party address. In this latter embodiment, the broker 106 electronically notifies the carrier (e.g., Federal Express or United Parcel Service) to redirect the package to the customer's true shipping address. This embodiment thus keeps the customer 102 completely anonymous to the merchant 104.

An accounting module 520 monitors the transactions that occur using the broker 106, invoices the customers 102, and credits the merchants 104. In embodiments where the agent 105 gets a portion of the revenue for creating the shopping cart, the accounting module 510 also credits the agent 105. In a typical case, the accounting module 520 charges the customer's credit card or other method of payment and credits the merchant's account for the amount of the purchase. In another embodiment, the accounting module 520 aggregates purchases made by the customers 102 and then periodically credits each merchant 104 for the value of the purchases made within the time period. In yet another embodiment, the accounting module 520 aggregates a customer's purchases within a given time period and then charges the customer's account once for aggregate total of the purchases. This latter embodiment might be desirable where, for example, the customer 102 makes many small purchases.

In some embodiments, instead of having only a single buyer, it is possible to have multiple buyers purchasing one or more items in a single shopping cart. In one embodiment, a shopping cart might contain only one item and multiple customers might be interested in contributing to the cost of this purchase. For example, where multiple customers wish to purchase a Chevrolet Corvette as a birthday gift for a friend, the Corvette can be listed in a virtual shopping cart created by an agent or otherwise sent to the broker 106. The multiple customers wishing to buy the gift can each agree to provide a portion of the total cost. Where there are only two customers 102, the customers 102 can each agree to pay half of the cost, or some other percentage (e.g., one customer agrees to pay 40% and the other pays 60%). Where there are more than two customers, the cost can be again broken down equally amongst the customers 102 (e.g., five customers each agree to pay 20% of the cost) or can be broken down in a different manner (e.g., five customers, where two agree to pay 20%, one pays 10%, one pays 5%, and one pays 45%). Thus, the product payment is split into two or more parts, with each person pledging to pay a certain portion of the total cost.

In another embodiment, multiple items are stored in the cart and there are two or more customers 102 who wish to purchase the items in cart. Again, the customers 102 can each pledge a portion of the total cost of the items in the cart. For example, a number of customers may each be interested in purchasing a few bottles of wine. However, the merchant 104 may only be offering a discount to a customer 102 who purchases a full case of wine. In this scenario, to get the case discount, the customers 102 must purchase each of their bottles together as a block purchase in order to have purchased enough bottles to form a case. Thus, the customers 102 can create a shopping cart containing a case of wine and can each pledge to pay a portion of the total cost (e.g., the portion of the cost equal to the few bottles of interest to the customer 102). The broker 106 can purchase the entire case for the customers 102 in one transaction (thereby obtaining the discount), and the broker 106 can charge each customer 102 his/her pledged amount (thereby allowing the customers to avoid having to work out the payments themselves later).

In some embodiments, the shopping cart management module 515 receives the pledges from the customers to pay a portion of the total price of an item or items contained within a virtual shopping cart. The shopping cart management module 515 can continue to manage receipt of the pledges if more pledges are made over time. In some embodiments, there is a master customer or master buyer who initiates the transaction for the purchase of the item(s) in the shopping cart and declares intent to purchase the item(s). In these embodiments, the master customer represents the group of customers 102 and interacts with the broker 106 to coordinate payment and shipping (e.g., providing shipping preferences, shipping addresses, providing gift certificates or coupons if any are available, generally managing the item(s) in the cart, etc.). Thus, in these embodiments, the master customer controls the transaction, and the other contributing buyers in the group only view the shopping cart and agree to pay a particular amount. The contributing buyers do not modify the shopping cart in these embodiments. In other embodiments, all customers 102 have the same abilities to modify the cart (including adding and deleting item(s), or otherwise modifying the item(s) in the cart) and coordinate payment and shipping (e.g., providing shipping preferences, shipping addresses, providing gift certificates or coupons if any are available, generally managing the item(s) in the cart, etc.). In these embodiments, there may still be a single customer 102 who initially declares intent to purchase the item(s) in the cart, but from that point on the other customers 102 in the group transaction can participate in managing the transaction. In other embodiments, all customers 102 in the group can each declare intent to purchase the item(s).

In these group-buying embodiments, the virtual shopping cart can be created and stored by the agent, as described above. In other embodiments, the virtual shopping cart can be stored by the merchant 104 (so that the customers 102 deal directly with the merchant 104), or stored with the broker 106 (as described in detail in U.S. patent application Ser. No. 11/299,168, filed on Dec. 29, 2005, entitled "Distributed Electronic Commerce System with Centralized Virtual Shopping Carts," which is hereby incorporated by reference herein in its entirety for all purposes).

Depending on where the shopping cart is stored, the pledging of portions of the cost can be provided to the merchant(s) 104, the broker 106, and/or the agent 105. In some embodiments, where the shopping cart is stored with the agent 105, the pledge can be made to either the agent 105 or directly to the broker 106. In embodiments where the pledges are made to and managed by the agent 105, the broker communications module 454 provides this pledge information to the broker 106 at the time of checkout. In some embodiments, the customers 102 simply indicate to the agent 105 a desire to purchase items in a shopping cart (e.g., clicking a "buy" button), and the pledging of different portions of the cost does not occur until the customers 102 are redirected to the broker 106 for the checkout process. The broker 106 can receive all of the pledges at the time of checkout, or the broker 106 can collect pledges for the customers 102 over a period of time until the total price has been pledged.

In some embodiments, the authorization module 514 of the broker can authorize the customer(s) 102 (e.g., the master customer 102 in some embodiments, or all of the customers 102 in the group in other embodiments). This can occur once the customer(s) 102 are ready to checkout and make the purchase. In some embodiments, each customer 102 is authorized before he/she can make a pledge. In some embodiments, each customer 102 logs in separately, either at the same time or different times, to pledge his/her portion of the total cost or to make the payment for his/her portion of the total cost. In some embodiments, one of the customers 102 acts as a representative (e.g., a master customer) and logs in to provide payment information for each of the other customers 102.

In some embodiments, a customer 102 (e.g., a master customer 102 in some embodiments or any of the customers 102 in the group in other embodiments) can create a shopping cart and invite others to view the cart and possibly participate in the purchase of the item(s) in the cart. For example, the customer(s) 102 might publish a link to the cart on a web page (e.g., a blog), send out an email containing the link, etc. As another example, the customer(s) 102 can send references as well as whole shopping carts by instant messaging (IM) (e.g., AOL INSTANT MESSENGER (AIM®), YAHOO! MESSENGER (YIM), GOOGLE TALK, etc.). As another example, the customer(s) 102 might communicate with one another using a chat room or other type of vehicle for group discussions. The customer(s) 102 can discuss the shopping cart and item(s) contained within, and can all view the cart through this mechanism. The customer(s) 102 can also discuss what pledge each is willing to make, and they can keep track of the pledges made so far. In some embodiments, the customer(s) 102 could create a dynamically-updated tally of how much is pledged and remains to be pledged. In some embodiments, the broker 106 keeps this tally for the customer(s) 102, and the customer(s) 102 can view this tally when desired.

Using these various methods, the customer(s) 102 can allow other people to access the shopping cart using the information provided. In these embodiments, if any of these persons are interested in contributing to the purchase, these persons can independently access the broker 106 and pledge an amount that the person is willing to pay.

As described above, the shopping cart management module 515 can receive the shopping cart and the transaction module 516 can review the total cost of the item(s) and review the pledges received so far. If the broker 106 has received enough pledges to cover the total cost of the item(s) in the cart, the accounting module 520 can charge the customer(s) 102. If the broker 106 has not yet received the total amount, the broker 106 can continue to wait for further pledges to be made. If the broker 106 has received more than the total cost, the accounting module 520 can indicate so to the customer(s) 102 (e.g., giving them a chance to modify the pledges) or the accounting module 520 can make the purchase and charge one or more of the customers 102 less than was pledged.

The transaction module 516 enables the customers to purchase the item. In some embodiments, the accounting module 520 charges each of the customers 102 the pledged amount before the transaction module 516 executes the transaction and enables the purchase. In other embodiments, the transaction module 516 makes the purchase before payment is received from each of the customers 102. In these embodiments, the broker 106 may require that each customer 102 submit payment information (e.g., credit card information) before the purchase is made, and the broker 106 can thereby ensure that each customer 102 is approved before making the purchase. Once the purchase is made, each customer 102 can be automatically billed by the accounting module 520 for his/her respective portion of the cost.

The broker 106 can also coordinate shipping and credit the merchant, etc. in generally the same manner as described above. Instead of shipping the item to the customers 102, the broker 106 can ship the item to the person for whom the customers 102 were purchasing the item (e.g., in the Corvette example) or the broker 106 might indicate to the merchant that certain items in the cart are to be shipped to different customers 102 (e.g., in the wine bottles example).

III. PROCESS/EXAMPLE

Figure 6:
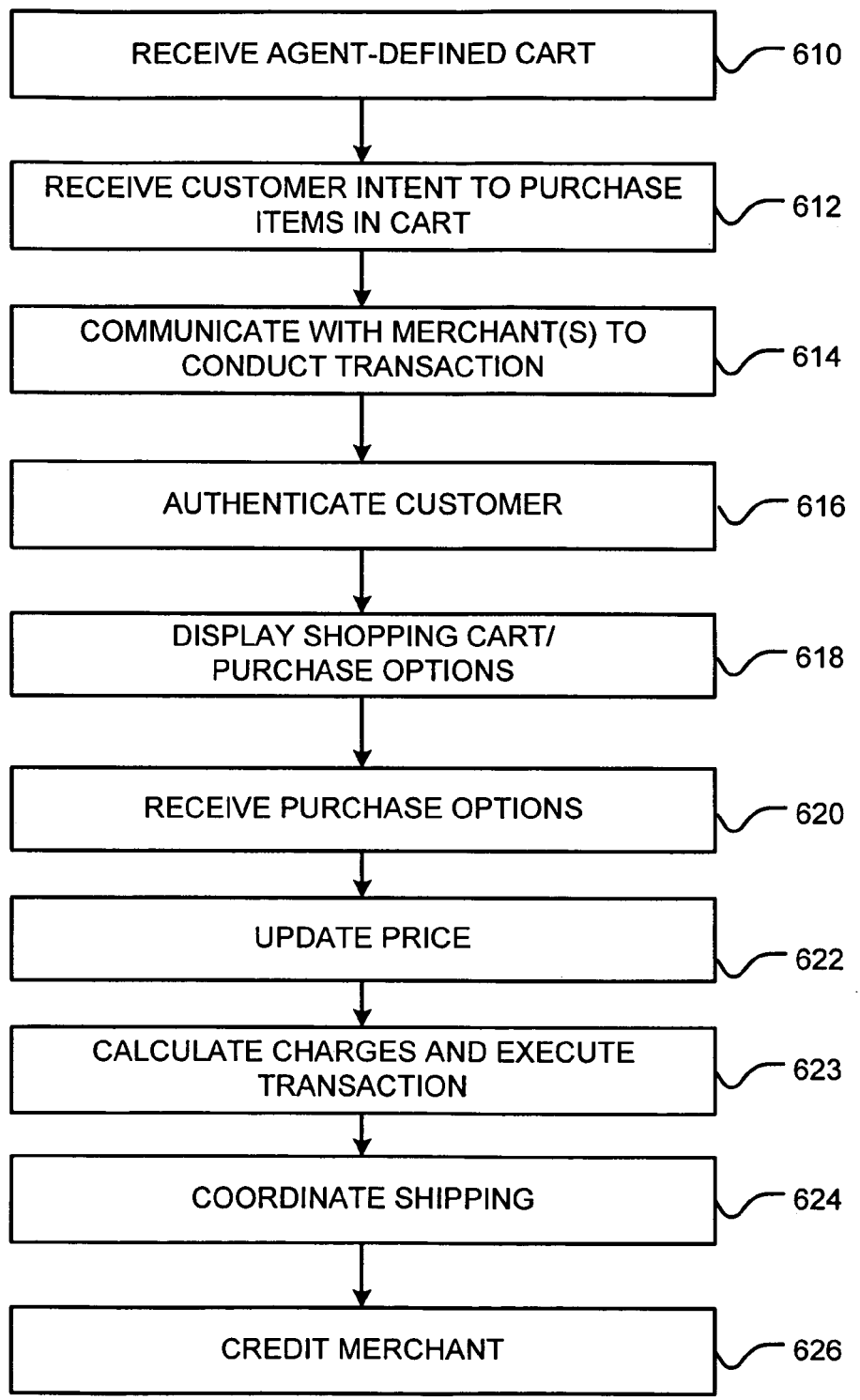
FIG. 6 is a flow chart illustrating the operation of the broker according to one embodiment.

FIG. 6 is a flow chart illustrating the operation of the broker 106 according to one embodiment. Those of skill in the art will recognize that other embodiments can perform the steps of FIG. 6 in different orders (the same is true of FIGS. 7 and 8). Moreover, other embodiments can include different and/or additional steps than the ones described here.

FIG. 6 illustrates steps performed by the broker 106 in an exemplary transaction where an agent 105 creates a shopping cart. Upon indication by a customer 102 of a desire to purchase the items in the cart (e.g., selecting a "buy" button), the agent 105 sends information regarding the cart to the broker 106 (e.g., where the information can include the cart itself, including descriptions of the items in the cart, such as type, price, identifiers, etc.) by either going through the customer 102 so the customer 102 provides the cart or sending the cart directly. Thus, the broker 106 receives 610 the agent-defined cart, including descriptions of items in the cart, etc. The broker 106 can further receive 612 indication of customer intent to purchase the items in the cart. In some embodiments, the broker 106 receives 612 customer intent to purchase when the customer 102 is automatically transferred over to the broker's 106 website to complete the transaction. The broker 106 also communicates 614 with the merchant(s) to conduct the transaction and obtain further information about the items being purchased including shipping options, updated pricing, etc.

In order to effect the purchase, the broker 106 authenticates 616 the customer 102. Authentication 616 can occur, for example, by asking the customer for an ID, password and/or other identifying information, reading a cookie provided by the customer's browser 310, and/or through another technique. The broker 106 can display 618 a representation of the shopping cart to the customer 102 (e.g., reminding the customer of what items the cart contains, the descriptions of the items, the costs, etc.). The broker 106 can also display 618 web page buttons or another interface that the customer 102 uses to select purchase options, such as a shipping method and address. The customer 102 selects the desired options, and the broker receives 620 the selections from the customer's browser 310.

In some embodiments, the broker 106 updates 622 the price of one or more of the items, as described above. For example, the prices of items in the cart can be dynamically updated 623 by the broker 106 and the customer 102 can be given the chance to approve the cart with updated pricing before purchase. Where the prices are static, the broker can update 623 the price by allowing the merchant 104 to refuse to the sell the item 104 for the quoted price, allowing the customer 102 to find the item elsewhere, etc. If no prices have changed, no update is necessary.

The broker 106 uses the purchase options selected by the customer 102 along with the updated pricing (if updates occurred) to calculate 623 the total charge for the transaction. These calculations typically take into account the cost of the items in the cart, shipping method selected by the customer 102, applicable taxes, and/or any other charges described by the merchant 104 in the shopping cart description. The broker 106 executes 623 the transaction by charging the customer's credit card, subtracting a value from a stored value account, and/or performing an equivalent action. In one embodiment, the broker 106 executes 623 the transaction by interacting with, and supplying payment information to, the merchant 104.

The broker 106 coordinates 624 shipping with the merchant 104, as described above. The broker 106 credits 626 the merchant 104 for the transaction. In one embodiment, the broker 106 keeps percentage of the transaction and/or charges the merchant 104 a fee for conducting the transaction. In one embodiment, the broker 106 also provides a percentage of the transaction to the agent 105.

Figure 7:
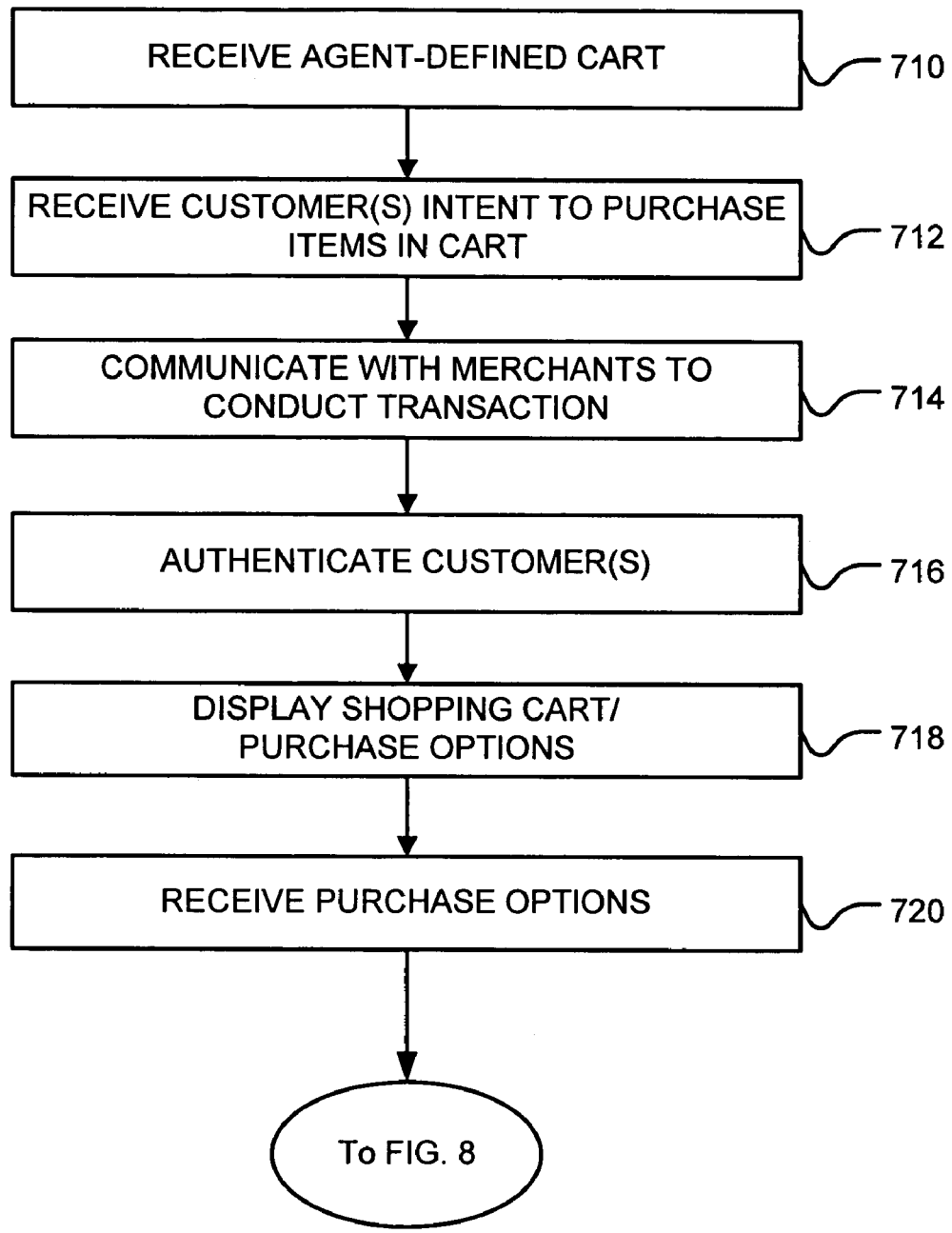
FIG. 7 is a flow chart illustrating the operation of the broker where multiple customers are purchasing item(s) in a shopping cart according to one embodiment

FIG. 7 is a flow chart illustrating the operation of the broker 106 where multiple customers 102 are purchasing item(s) in a shopping cart according to one embodiment. In these embodiments, one or more customers 102 indicate a desire to purchase one or more items in a single shopping cart. In one embodiment, a shopping cart contains only one item and the multiple customers 102 pledge to pay a certain portion of the purchase price (e.g., three buyers in which one agrees to pay 20%, one pays 45% and one pays 35%). In another embodiment, multiple items are stored in the cart and there are two or more customers 102 who wish to purchase the items in cart. Again, the customers 102 can each pledge a portion of the total cost of the items in the cart.

As described above regarding FIG. 6, the broker 106 can receive 710 the agent-defined cart including descriptions of items. The broker 106 can further receive 712 indication of intent of one or more of the customers 102 to purchase the items in the cart. As described above, in some embodiments, there is a master customer or master buyer who initiates the transaction for the purchase of the item(s) in the shopping cart and declares intent to purchase the item(s), coordinates payment and shipping (e.g., providing shipping preferences, shipping addresses, providing gift certificates or coupons if any are available), generally manages the item(s) in the cart, etc. In other embodiments, all customers 102 have the same abilities to modify the cart (including adding and deleting item(s), or otherwise modifying the item(s) in the cart) and coordinate payment and shipping (e.g., providing shipping preferences, shipping addresses, providing gift certificates or coupons if any are available, generally managing the item(s) in the cart, etc.).

The broker 106 also communicates 714 with the merchant(s) to conduct the transaction and obtain further information about the items being purchased including shipping options, updated pricing, etc. In order to effect the purchase, the broker 106 authenticates 716 one or more of the customers 102 wishing to purchase the items in the shopping cart (e.g., by asking the customer for an ID, password and/or other identifying information, reading a cookie provided by the customer's browser 310, and/or through another technique). The broker 106 can display 718 a representation of the shopping cart to the one or more customers 102 and can also display 718 web page buttons or another interface that the customer(s) 102 use to select purchase options, such as a shipping method and address. The customer(s) 102 select the desired options, and the broker receives 720 the selections from the customers' browsers 310.

Figure 8:
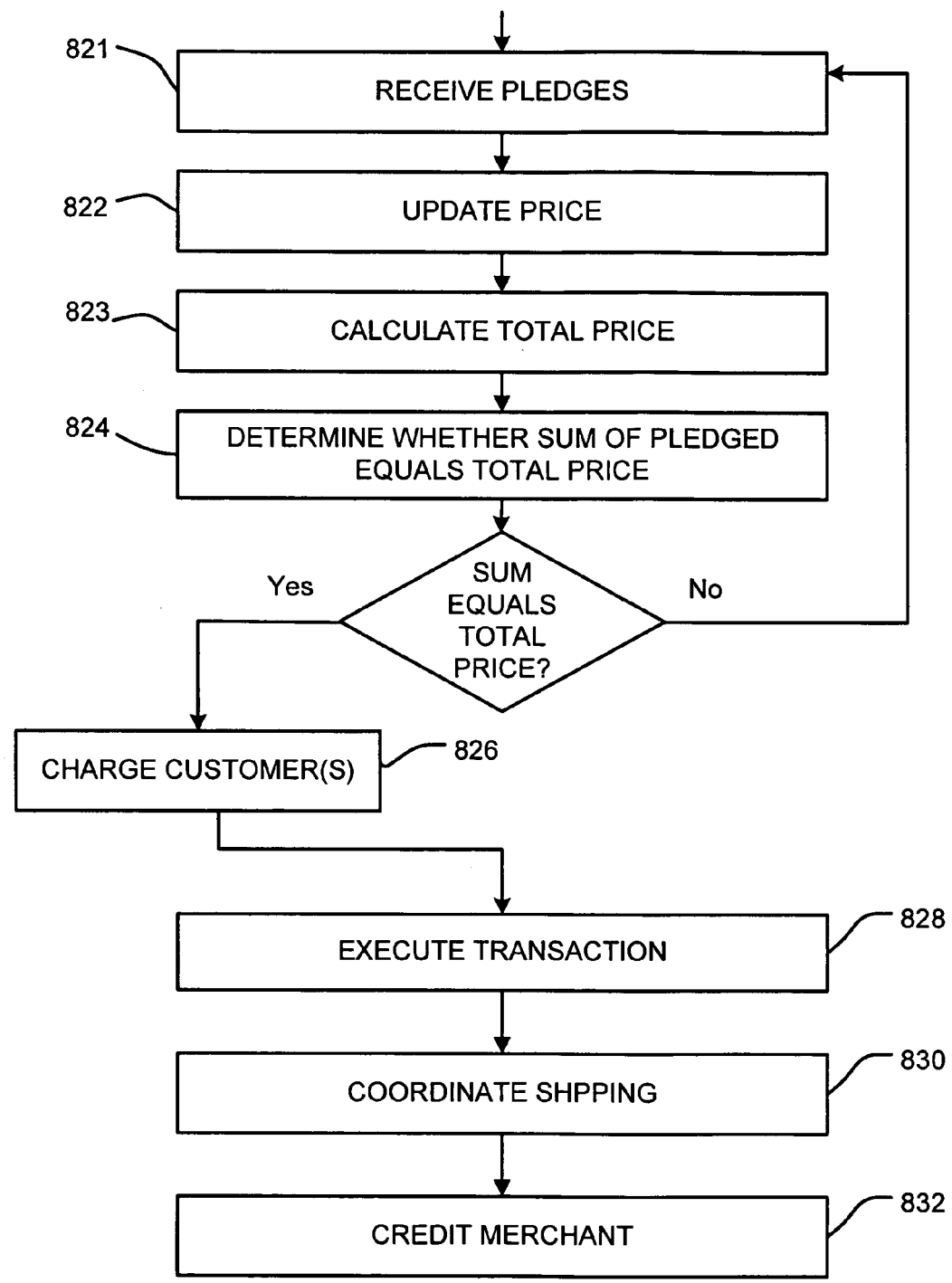
FIG. 8 is a flow chart illustrating the operation of the broker where multiple customers are purchasing item(s) in a shopping cart and providing pledges according to one embodiment The figures depict an embodiment of the present invention for purposes of illustration only. One skilled in the art will readily recognize from the following description that alternative embodiments of the structures and methods illustrated herein may be employed without departing from the principles of the invention described herein.

FIG. 8 is a flow chart illustrating the operation of the broker 106 where multiple customers 102 are purchasing item(s) in a shopping cart according to one embodiment. The broker 106 receives 821 pledges from one or more of the customers 102 (or the pledges can be made to the agent 105, and passed on to the broker 106). The broker 106 can start receiving 821 these pledges as soon as the shopping cart is established, and can continue to receive these pledges until at least the total price of the items in the cart has been reached. In some embodiments, the broker 106 updates 823 the price of one or more of the items, as described above. In some embodiments, the broker 106 uses the purchase options selected by the customer(s) 102 and updated price (if an update occurred) to calculate 822 the total charge for the transaction, and thus the broker 106 uses this total charge as the total price that must be pledged by the customer(s) 102. These calculations typically take into account the cost of the items in the cart, shipping method selected by the customer(s) 102, applicable taxes, and/or any other charges provided by the merchant 104. In other embodiments, the broker 106 simply uses the prices listed by the merchants 104 for the items and just estimates extra charges, such as taxes, shipping, etc.

As pledges are being received 821, the broker 106 can determine 824 whether the sum of the pledged portions equals the total price of the items in the shopping cart. If the sum equals the total price, the broker 106 can charge 826 each of the customers 102 the portion that the customer indicated he would pay. If the sum does not yet equal the total price, the broker 106 can continue to receive 821 pledges until the total price is reached. In some embodiments, the total price may have to be recalculated or updated by the merchants 104 if the pledging process takes too long, since the prices of items in the cart may change over time.

In some embodiments, the broker 106 executes 828 the transaction and thus enables the customers 102 to purchase the item(s) after receiving payment of the pledged portion of the cost from each of the customers 102. In some embodiments, the broker 106 executes 828 the transaction before receiving payment from each of the customers 102. In these embodiments, the broker 106 may require that each customer 102 submit payment information (e.g., credit card information) before the purchase is made so the broker 106 can ensure that the customer 102 is approved before making the purchase. The broker 106 coordinates 830 shipping with the merchant 104, as described above. The broker 106 also credits 832 the merchant 104 for the transaction. In one embodiment, the broker 106 keeps percentage of the transaction and/or charges the merchant 104 a fee for conducting the transaction. In one embodiment, the broker 106 also provides a percentage of the transaction to the agent 105.

The broker 106 thus allows customers 102 to purchase items from multiple merchants 104 in different domains stored in a single shopping cart (or multiple carts) created by an agent 105. The shopping carts can be used for baby showers, wedding registries, ordering supplies for an enterprise, and in other scenarios where there is a desire to aggregate and purchase items from multiple merchants 104 in different domains. Using the broker 106 in this manner also provides security because it allows customers 102 to make purchases from multiple merchants 104 without providing the customers' personal data to each merchant 104. In addition, using the broker 106 allows merchants 104 to increase their sales by lowering their barriers to purchase and leveraging the reputation and trustworthiness of the broker 106. The broker 106 can also allow customers 102 divide up the total purchase price for items in the cart and each pay a portion. The broker 106 manages the transaction with the merchants 104 and charges the customers 102 each their pledged portions so the customers 102 do not have to manage the dividing up of the payments.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. An electronic commerce system comprising:
  a non-transitory computer-readable storage medium storing executable software modules comprising:
    a shopping cart management module for, responsive to a customer selecting a single shopping cart link to purchase a pre-arranged virtual shopping cart created by an agent and containing a plurality of items selected by the agent from a plurality of different online merchants, receiving information from the agent regarding the pre-arranged virtual shopping cart and the items contained within the pre-arranged virtual shopping cart;
    a transaction module for:
      dynamically updating one or more prices of items in the virtual shopping cart to reflect current prices offered by the merchants for the items;
      determining a total price, based on the dynamically updated prices, for purchasing the items in the virtual shopping cart;
    an accounting module for charging the customer the total price determined and for crediting the merchants and the agent for each item purchased from each merchant; and
  a processor configured to execute the software modules stored by the computer readable storage medium.

2. The electronic commerce system of claim 1, wherein the transaction module is further configured for:
  managing a single transaction between the agent, the merchants, and the customer, in which the customer purchases the items from the different online merchants; and
  receiving payment information from the customer to purchase multiple items from multiple different merchants without providing the payment information to the merchants.

3. The electronic commerce system of claim 1, wherein the information includes a description of items contained within the cart.

4. The electronic commerce system of claim 1, wherein the shopping cart is displayed on a website managed by the agent that the customer reviews to determine whether to purchase items contained within the shopping cart.

5. The electronic commerce system of claim 1, wherein items within the shopping cart are each associated with one or more identifiers for keeping track of the items.

6. The electronic commerce system of claim 1, wherein the shopping cart is associated with an identifier for associating the shopping cart with the customer.

7. The electronic commerce system of claim 1, further comprising a shipping coordination module for coordinating shipping of the items by each of the merchants to the customer.

8. The electronic commerce system of claim 7, wherein the shipping coordination module is configured to coordinate the shipping by:
  interacting with the merchants to inform the merchants of the transaction; and
  providing the merchants with customer-indicated shipping address and preferences for the merchants to ship each of the items to the customer.

9. The electronic commerce system of claim 7, wherein the shipping coordination module is configured to maintain anonymity of the customer and confidentiality of a shipping address provided by the customer by:
  interacting with the merchants to inform the merchants of the transaction;
  providing a third party shipping address for a shipping carrier to the merchants;
  instructing the merchants to ship the items to the third party shipping address; and
  notifying the shipping carrier to redirect the package to a customer-indicated shipping address for the customer.

10. The electronic commerce system of claim 1, wherein the accounting module is further configured to credit each of the merchants by:
  aggregating purchases from the merchant by customers; and
  periodically crediting each merchant for the aggregated purchases made.

11. The electronic commerce system of claim 1, wherein the transaction module is further configured for:
  receiving agent-listed prices from the agent for each of the items in the pre-arranged shopping cart;
  comparing the agent-listed prices to merchant-listed prices for each of the items in the pre-arranged shopping cart;
  determining whether merchant-listed prices have increased or decreased since creation of the cart by the agent;
  updating a price for the pre-arranged cart based on the determination; and
  notifying the customer of the updated price.

12. The electronic commerce system of claim 1, wherein the transaction module is further configured for:
  determining merchant-listed prices for each of the items in the pre-arranged shopping cart;
  calculating a total price for the pre-arranged shopping cart of the items;
  notifying the customer of the total price; and
  receiving approval from the customer for purchasing the shopping cart of the items at the total price.

13. A computer-implemented method of conducting electronic commerce comprising:
  using a processor to execute method steps, comprising:
    responsive to a customer selecting a single shopping cart link to purchase a pre-arranged virtual shopping cart created by an agent and containing a plurality of items selected by the agent from a plurality of different online merchants, receiving information from the agent regarding the pre-arranged virtual shopping cart and the items contained within the pre-arranged virtual shopping cart;
    dynamically updating one or more prices of items in the pre-arranged virtual shopping cart to reflect current prices offered by the merchants for the items;
    determining a total price, based on the dynamically updated prices, for purchasing the items in the pre-arranged virtual shopping cart;
    charging the customer the total price determined; and
    crediting the merchants and the agent for each item purchased from each merchant.

14. The method of claim 13, wherein managing the transaction further comprises:
   managing a single transaction between the agent, the merchants, and the customer, in which the customer purchases the items from the different online merchants; and
   receiving payment information from the customer to purchase the items from the different online merchants without providing the payment information to the merchants.

15. The method of claim 13, wherein the information includes price, type, and quantity for items in the shopping cart.

16. The method of claim 13, wherein the shopping cart is displayed on a website managed by the agent that the customer reviews to determine whether to purchase items contained within the shopping cart.

17. The method of claim 13, further comprising:
   responsive to dynamically updating the prices and determining the total price, providing the updated prices to the customer for the first time during checkout of the customer, wherein the customer provides approval for the purchase of the pre-arranged shopping cart at the provided prices.

18. The method of claim 13, wherein dynamically updating prices of the items during the purchase further comprises referring to each merchant's website listing current prices for each of the items and adjusting the prices to the current prices according to the websites.

19. The method of claim 13, further comprising:
   contacting a merchant selling an item to confirm a quoted price;
   determining that the merchant's listed price for the item has increased; and
   providing the merchant with an opportunity to refuse to sell the item for that quoted price.

20. A computer program product having a non-transitory computer-readable medium having executable computer program instructions embodied therein for supporting an electronic commerce system, the computer program instructions comprising:
   a shopping cart management module for, responsive to a customer selecting a single shopping cart link to purchase a pre-arranged virtual shopping cart created by an agent and containing a plurality of items selected by the agent from a plurality of different online merchants, receiving information from the agent regarding the pre-arranged virtual shopping cart and the items contained within the pre-arranged virtual shopping cart;
   a transaction module for:
      dynamically updating one or more prices of items in the pre-arranged virtual shopping cart to reflect current prices offered by the merchants for the items;
      determining a total price, based on the dynamically updated prices, for purchasing the items in the pre-arranged virtual shopping cart; and
   an accounting module for charging the customer the total price determined and for crediting the merchants and the agent for each item purchased from each merchant.

21. The computer program product of claim 20, wherein the transaction module is further configured for:
   managing a single transaction between the agent, the merchants, and the customer, in which the customer purchases the items from the different online merchants; and
   receiving payment information from the customer to purchase the items from the different online merchants without providing the payment information to the merchants.

22. The computer program product of claim 20, wherein the information includes a description of items contained within the cart.

23. The computer program product of claim 20, wherein the shopping cart is displayed on a website managed by the agent that the customer reviews to determine whether to purchase the shopping cart.

24. The computer program product of claim 20, wherein the transaction module is further adapted to contact each merchant regarding current prices of the items in the pre-arranged shopping cart to dynamically update prices of the items during the purchase.

25. The computer program product of claim 24, wherein the transaction module is further adapted to obtain approval from the customer for the shopping cart with updated prices.

26. The computer program product of claim 20, wherein the shopping cart is associated with an identifier.

27. A broker in an electronic commerce system, comprising:
   a non-transitory computer-readable storage medium storing executable software modules of the broker comprising:
      a shopping cart management module of the broker adapted to, responsive to a customer selecting a single shopping cart link to purchase a pre-arranged virtual shopping cart created by an agent and containing a plurality of items selected by the agent from a plurality of different online merchants, receive information from the agent regarding the pre-arranged virtual shopping cart and the items contained within the pre-arranged virtual shopping cart;
      a transaction module of the broker adapted to:
         dynamically update one or more prices of items in the pre-arranged virtual shopping cart to reflect current prices offered by the merchants for the items;
         determine a total price, based on the dynamically updated prices, for purchasing the items in the pre-arranged virtual shopping cart;
      an accounting module of the broker adapted to charge the customer the total price determined and to credit the merchants and the agent for each item purchased from each merchant; and
   a processor configured to execute the software modules stored by the computer readable storage medium.

28. The broker of claim 27, wherein the transaction module is further adapted to:
   manage a single transaction between the agent, the merchants, and the customer, in which the customer purchases the items from the different online merchants; and
   receiving payment information from the customer to purchase the items from the different online merchants without providing the payment information to the merchants.

29. The broker of claim 27, wherein the information includes a description of type and price of items contained within the cart.

30. The broker of claim 27, wherein the shopping cart is displayed on a website managed by the agent that the customer reviews to determine whether to purchase items contained within the shopping cart.

31. The broker of claim 27, wherein items within the shopping cart are each associated with one or more identifiers for keeping track of the items.

32. The electronic commerce system of claim 27, wherein the broker, the merchants, the agent, and the customer are each independent parties operating within different domains.

33. An electronic commerce system, comprising:
a non-transitory computer-readable storage medium storing executable software modules comprising:
shopping cart management means for, responsive to a customer selecting a single shopping cart link to purchase a pre-arranged virtual shopping cart created by an agent and containing a plurality of items selected by the agent from a plurality of different online merchants, receiving information from the agent regarding the pre-arranged virtual shopping cart and the items contained within the pre-arranged virtual shopping cart;
transaction means for:
dynamically updating one or more prices of items in the pre-arranged virtual shopping cart to reflect current prices offered by the merchants for the items;
determining a total price, based on the dynamically updated prices, for purchasing the items in the pre-arranged virtual shopping cart;
accounting means for charging the customer the total price determined and for crediting the merchants and the agent for each item purchased from each merchant; and
a processor configured to execute the software modules stored by the computer readable storage medium.

34. The electronic commerce system of claim 33, wherein the transaction means is further configured for:
managing a single transaction between the agent, the merchants, and the customer, in which the customer purchases the items from the different online merchants; and
receiving payment information from the customer to purchase the items from the different online merchants without providing the payment information to the merchants.

35. The electronic commerce system of claim 33, wherein the information includes a description of items contained within the cart.

36. The electronic commerce system of claim 33, wherein the shopping cart is displayed on a website managed by the agent that the customer reviews to determine whether to purchase the shopping cart.

\* \* \* \* \*